United States Patent [19]
Dolan

[11] Patent Number: 5,782,340
[45] Date of Patent: Jul. 21, 1998

[54] TAPERED SIDE SUPPORT FOR CONVEYOR BELTS

[76] Inventor: Rex H. Dolan, P.O. Box 528, Carthage, Miss. 39061

[21] Appl. No.: 812,032

[22] Filed: Mar. 6, 1997

[51] Int. Cl.⁶ ............................................. B65G 15/62
[52] U.S. Cl. ................................ 198/841; 198/840
[58] Field of Search ........................ 198/836.1, 837, 198/841, 840, 853

[56] References Cited

U.S. PATENT DOCUMENTS

| | | | |
|---|---|---|---|
| 3,513,964 | 5/1970 | Imse | 198/840 X |
| 4,742,907 | 5/1988 | Palmaer | 198/841 |
| 5,031,757 | 7/1991 | Draebel et al. | 198/841 X |
| 5,127,515 | 7/1992 | Damkjaer | 198/841 X |
| 5,181,601 | 1/1993 | Palmaer | 198/831 |
| 5,219,064 | 6/1993 | Roman | 198/841 X |
| 5,419,428 | 5/1995 | Palmaer | 198/831 |

FOREIGN PATENT DOCUMENTS

| | | | |
|---|---|---|---|
| 0156214 | 6/1989 | Japan | 198/840 |

OTHER PUBLICATIONS

Dyna-Veyor Direct Replacement Flex Chain, Dyna-Veyor Inc. Apr. 1975.

Belt Guide, IBM Technical Disclosure Bulletin, vol. 22 No. 2, Jul. 1979.

*Primary Examiner*—James R. Bidwell
*Attorney, Agent, or Firm*—Brady, O'Boyle & Gates

[57] ABSTRACT

A tapered side support for conveyor belts wherein tapered recesses and projections having correspondingly tapered surfaces are selectively provided on the sides of a conveyor support frame assembly and a conveyor belt. The tapered recesses and projections are slidably mounted relative to each other for supporting the conveyor belt. When used on an endless conveyor belt, the load supporting flight and return flight are supported by the tapered side support, which also facilitates the flushing and draining of the side support during the cleaning of the conveyor belt.

9 Claims, 4 Drawing Sheets

TAPERED SIDE SUPPORT FOR CONVEYOR BELTS

BACKGROUND OF THE INVENTION

U.S. Pat. Nos. 4,742,907; 5,181,601; and 5,419,428 disclose plastic conveyor belts having integral guide members including a hold down tab extending parallel to the horizontal plane of the conveyor belt and adapted to engage against wearstrip structure on a stationary portion of the conveyor belt system just below the load carrying flight of the belt. By the construction and arrangement, the belt is guided in its travel around the outside of a curve.

While the guide members and wearstrips disclosed in the above-noted patents are satisfactory for their intended purpose, they have been characterized by certain disadvantages in that the basic plastic conveyor belts made up of a series of interconnected modules often used in food handling and processing had to be custom made to provide the conventional plastic conveyor belt with the integral guide members. Also, the integral guide members and cooperating wearstrip structure were constructed and arranged to guide and support the load carrying flight of the endless belt only when travelling around a curve in the belt path, and the configuration of the hold down tabs made it difficult to properly clean and flush the conveyor belt.

SUMMARY OF THE INVENTION

After considerable research and experimentation, the tapered side support for conveyors of the present invention has been devised to overcome the objections experienced with heretofore employed guide members and wearstrips, and comprises, essentially, cooperating tapered projections and recesses provided selectively on the endless conveyor and wearstrips on the sides of the conveyor support frame, whereby not only is the load carrying flight of the conveyor supported, but also the return flight as well. Also, the conveyor is guided during its travel not only along a straight-away, but also around a curve, and the tapered configuration of the cooperating tapered recesses and projections facilitates the flushing and draining of the side supports during the cleaning of the conveyor belt.

DESCRIPTION OF THE PREFERRED EMBODIMENTS

Figure 1:
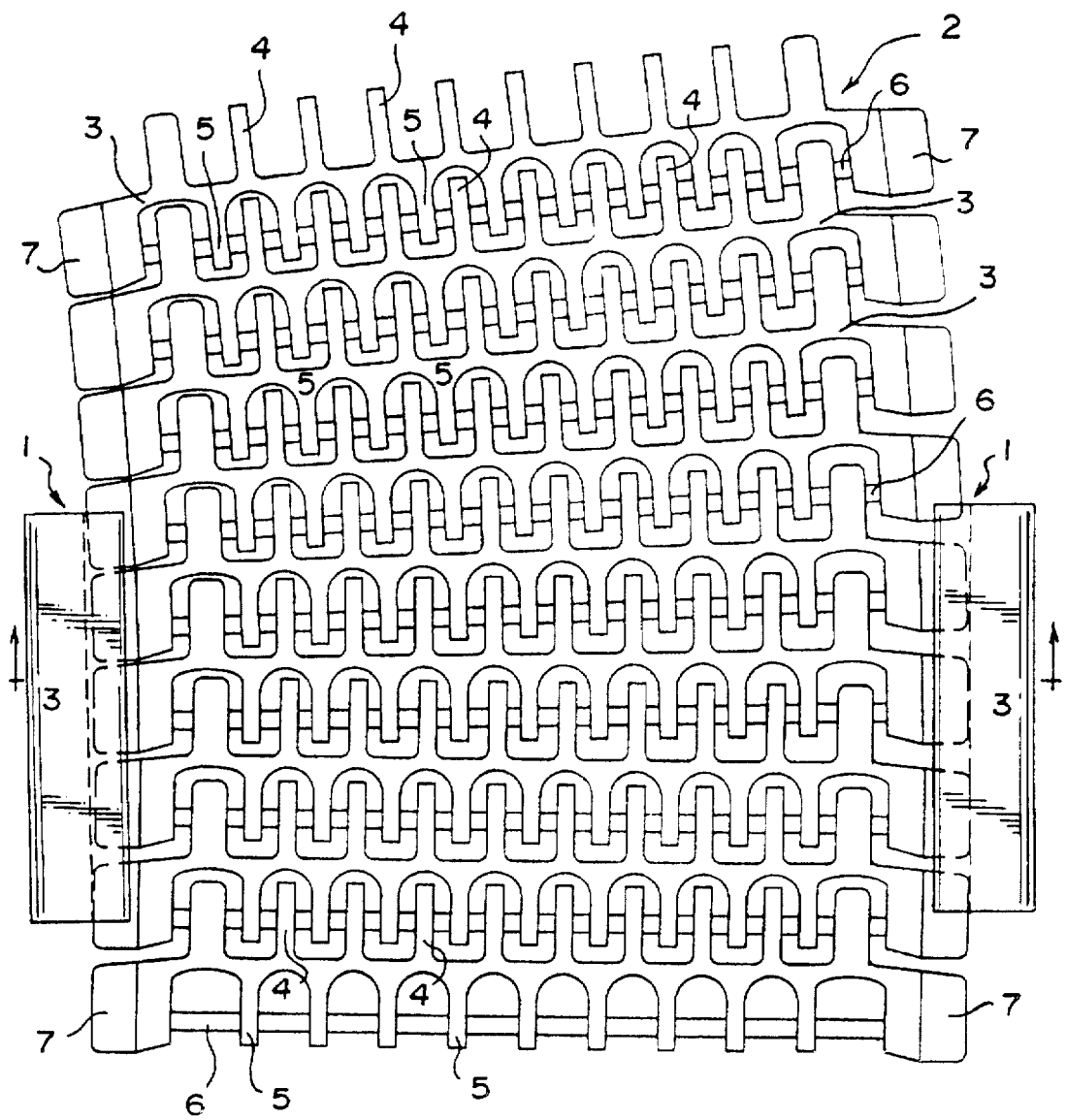
FIG. 1 is a fragmentary top plan view of a section of a plastic conveyor belt employing the tapered side support of the present invention.
Figure 2:
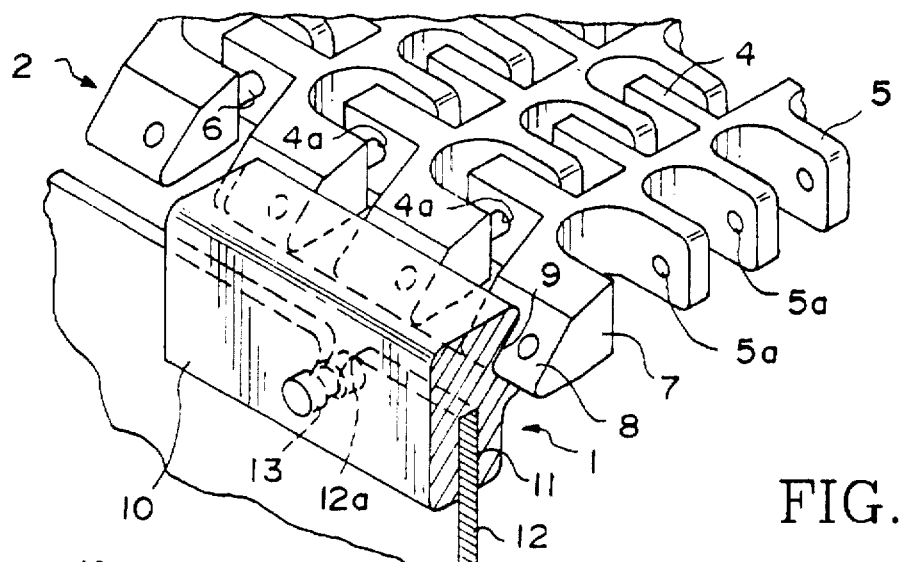
FIG. 2 is a fragmentary perspective view of the plastic conveyor belt and side support shown in FIG. 1.

Referring to the drawings and, more particularly, to FIGS. 1 and 2, the tapered side support 1 of the present invention is illustrated for use with a conventional plastic conveyor belt 2 of the type disclosed in U.S. Pat. No. 4,742,907 wherein a plurality of modules are interconnected to form the conveyor belt 2. Each module comprises an elongated molded plastic body 3 having a plurality of first equally spaced projections 4 extending integrally from one side thereof, and a plurality of second equally spaced projections 5 extending integrally from the opposite side thereof in symmetric interdigital relationship with respect to the plurality of first projections 4. The plurality of modules are interdigitated and interconnected by transverse rods or pins 6 extending through suitable apertures 4a and 5a provided in the projections 4 and 5.

Figure 3:
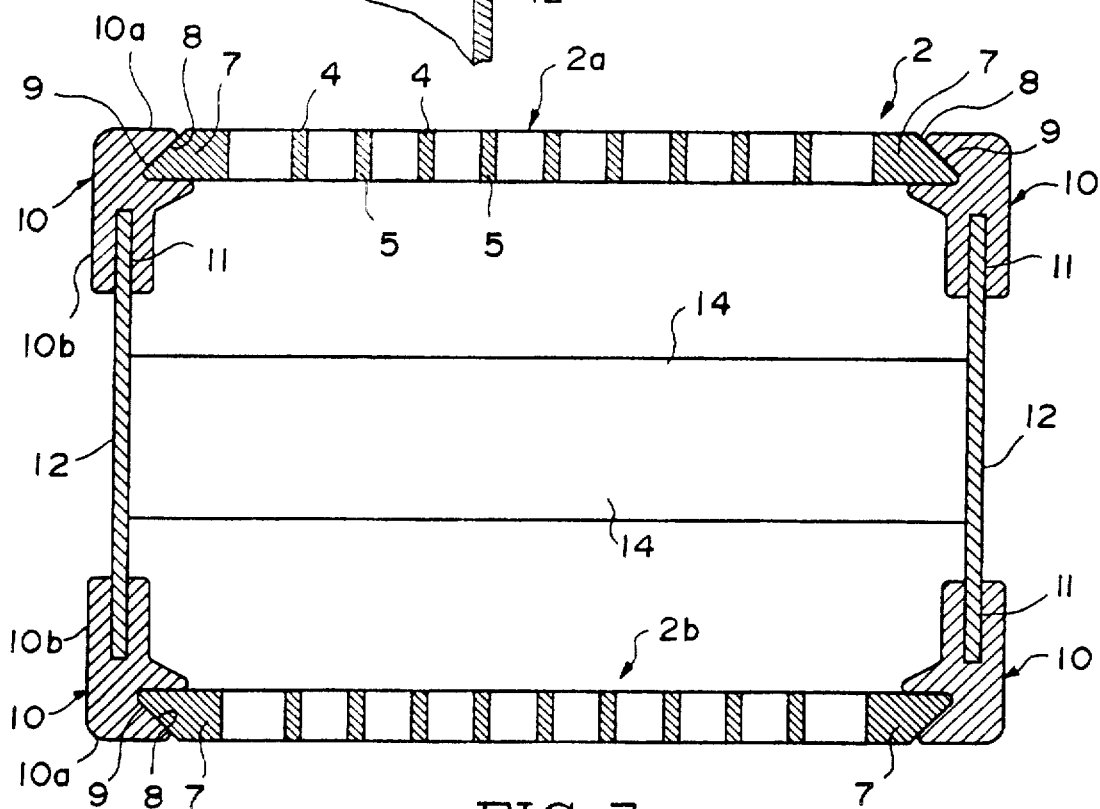
FIG. 3 is a view taken along line 3—3 of FIG. 1.

As will be seen in FIGS. 1 to 3, the plastic conveyor belt 2 has integral sideplates 7 which are of a considerably heavier and thicker plastic construction than the normal projections 4 and 5. The sideplates 7 are provided with a tapered surface 8 which is slidably received within a correspondingly shaped recess 9 provided in plastic wearstrips 10. Each wearstrip 10 is configured as a right angle flange member having the recess 9 formed in one leg 10a and a slot 11 provided in the other leg 10b of the flange member. The top and bottom edges of vertical sideplates 12 of the conveyor support frame are inserted into the slots 11 of the wearstrip 10, each of which is fixed to a respective sideplate 12 by a transverse pin 13 embedded in the wearstrip 10 and extending across the slot 11, the pin 13 being receivable in notches 12a provided in the top and bottom edges of the sideplates 12.

A transversely extending plate 14 is rigidly connected at each end to the sideplates 12 of the conveyor support frame for reinforcing the sideplates 12.

By the construction and arrangement of the tapered side support of the present invention, not only is the load carrying flight 2a of the conveyor supported, but also the return flight 2b, and the tapered configuration of the cooperating sideplates 7 and recesses 9 facilitate the flushing and draining of the side supports during the cleaning of the conveyor belt.

A conventional plastic conveyor belt can be retrofitted to accommodate the wearstrip 10 by cutting or grinding the tapered surface 8 on the sideplates 7; otherwise, the tapered surface 7a can be formed on the sideplates 7 when the plastic components of the conveyor belt are initially molded.

Figure 4:
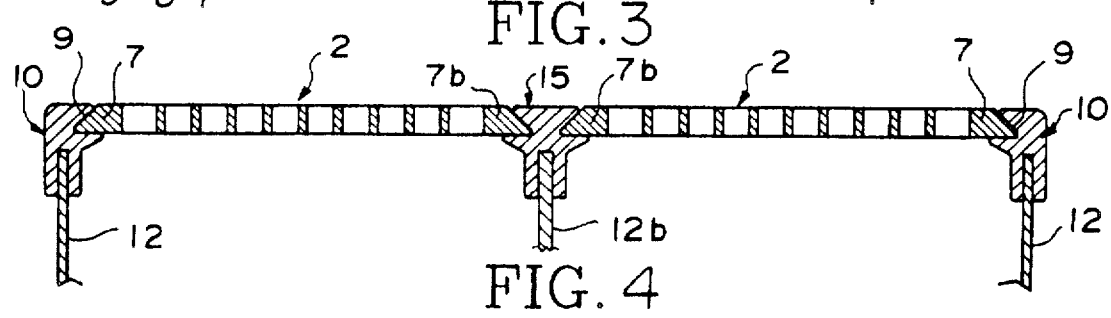
FIG. 4 is a fragmentary, sectional end view showing an embodiment wherein the tapered side support of the present invention is employed for a pair of side-by-side plastic conveyors.

FIG. 4 illustrates another embodiment of the side support of the present invention, wherein a pair of plastic conveyor belts 2 are positioned in side-by-side relationship with their outboard sideplates 7 slidably mounted in the wearstrips 10 on the vertical sideplates 12, and their inboard sideplates 7b slidably mounted in a double outwardly and oppositely facing recessed wearstrip 15 mounted on the top edge and bottom edge (not shown) on an intermediate plate 12b, positioned between the vertical sideplates 12.

Figure 5:
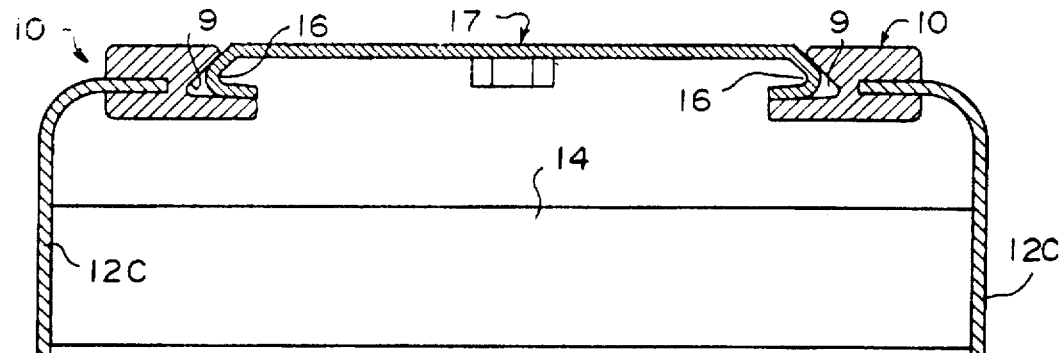
FIG. 5 is an end view, in section, illustrating another embodiment of the tapered side support of the present invention employing a metal table top endless conveyor.
Figure 7:
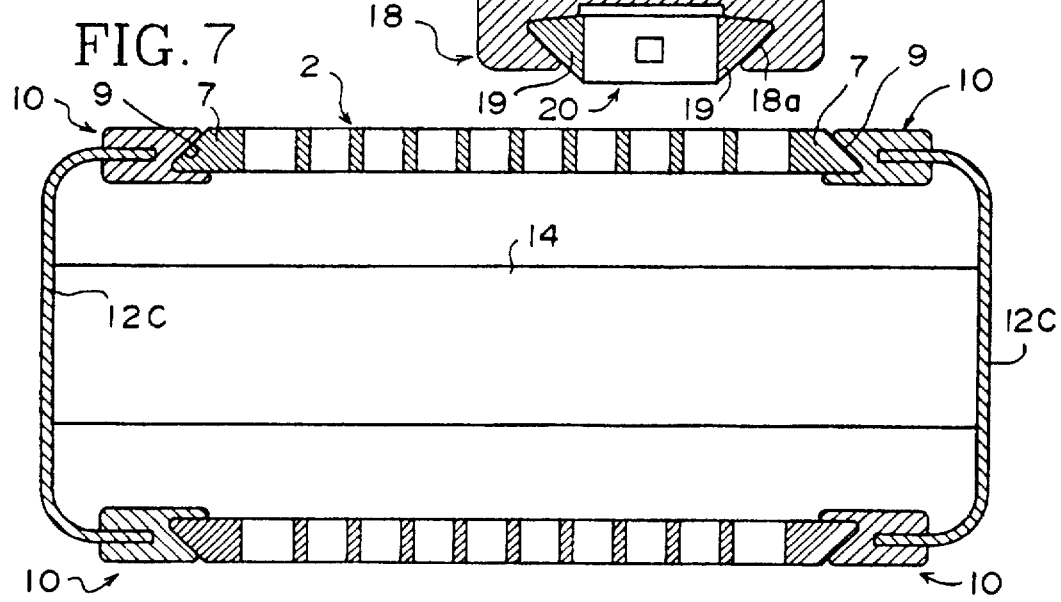
FIG. 7 is a view similar to FIG. 3 but showing the sides of the support frame having a channel configuration rather than straight sideplates.

FIGS. 5 and 7 illustrate yet another embodiment of the side support of the present invention, wherein the side support plates of the conveyor support frame comprise oppositely facing, inwardly extending channel members 12c. Each wearstrip 10 is configured as a horizontally extending block affixed to the inwardly extending leg members of the channels 12 in the same manner as described above in connection with the wearstrip 10 on plate 12, and as shown in FIG. 2. In FIG. 5, the recesses 9 in the wearstrips 10 slidably receive the tapered and rolled side edges 16 of a metal table top endless conveyor 17; whereas, in FIG. 7, the wearstrips 10 slidably receive the sideplates 7 in the same manner as described above in connection with the embodiment of FIG. 3.

Figure 6:
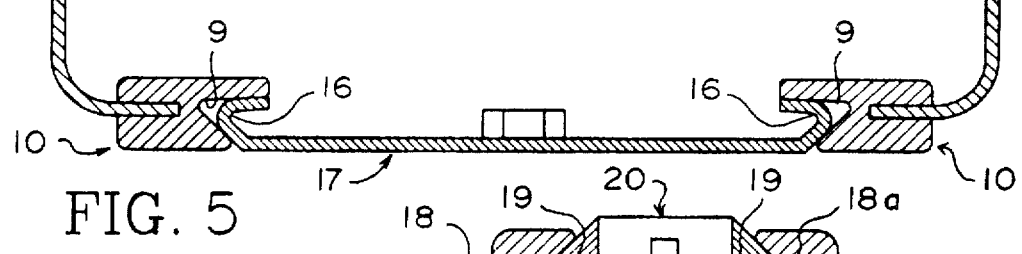
FIG. 6 is an end view, in section, illustrating yet another embodiment of the tapered side support of the present invention supporting a chain conveyor.

FIG. 6 illustrates still another embodiment of the side support of the present invention wherein the sideplate channel members 12c are positioned inwardly closer together than in the embodiment shown in FIGS. 5 and 7. Channel blocks 18 are positioned in the spaces between oppositely facing legs of the channel members 12c, the legs of the channel members 12 being secured to the channel blocks 18 in the same manner as shown in FIG. 2. The oppositely facing walls of the channel portion of the blocks 18 are provided with recesses 18a for slidably receiving the tapered sideplates 19 of a narrow chain conveyor 20.

Figure 8:
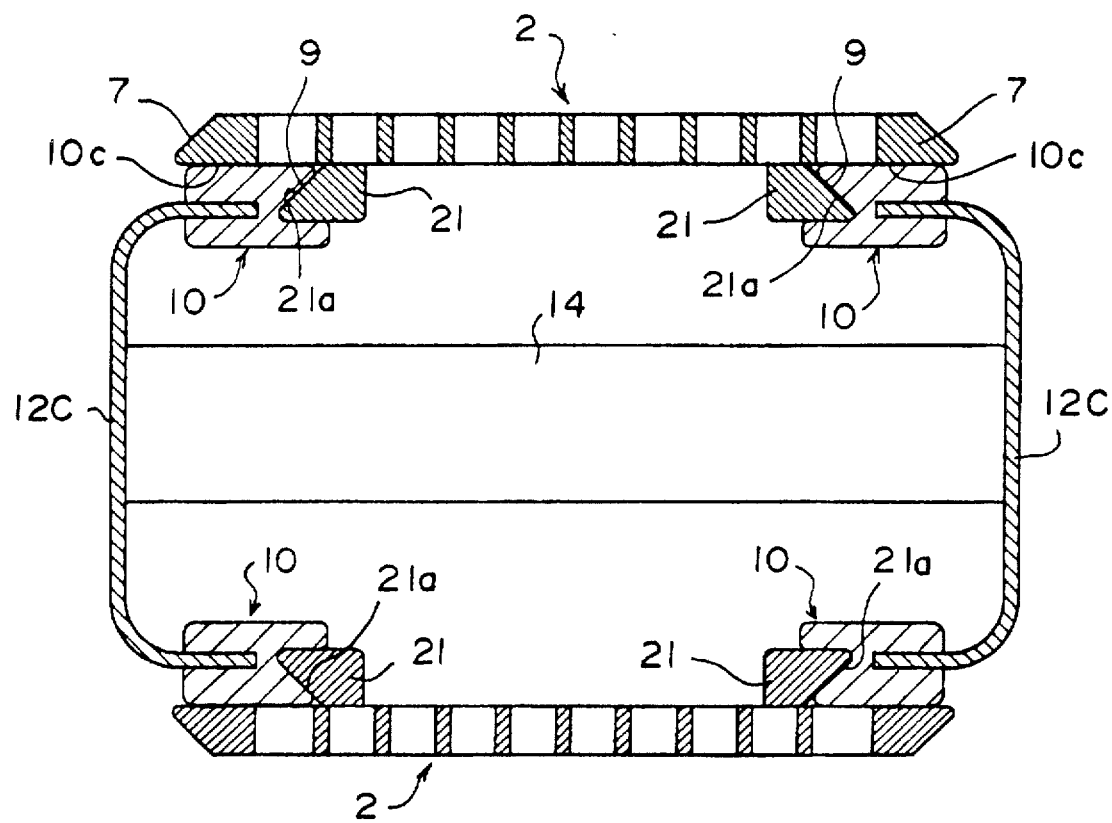
FIG. 8 is an end view, in section, similar to the embodiment of FIG. 7 but illustrating yet still another embodiment wherein the bottom surface of the plastic conveyor is provided with depending tapered projections cooperating with tapered recesses provided in the channel shaped side walls of the conveyor support frame.

FIG. 8 illustrates a further embodiment of the side support shown in FIG. 7, wherein the bottom surface of the conveyor 2 is provided with depending projections 21 having outwardly facing tapered surfaces 21a slidably mounted in the recesses of the wearstrips 10. The sideplates 7 of the conveyor are supported on the top surfaces 10c of the wearstrips 10.

Figure 9:
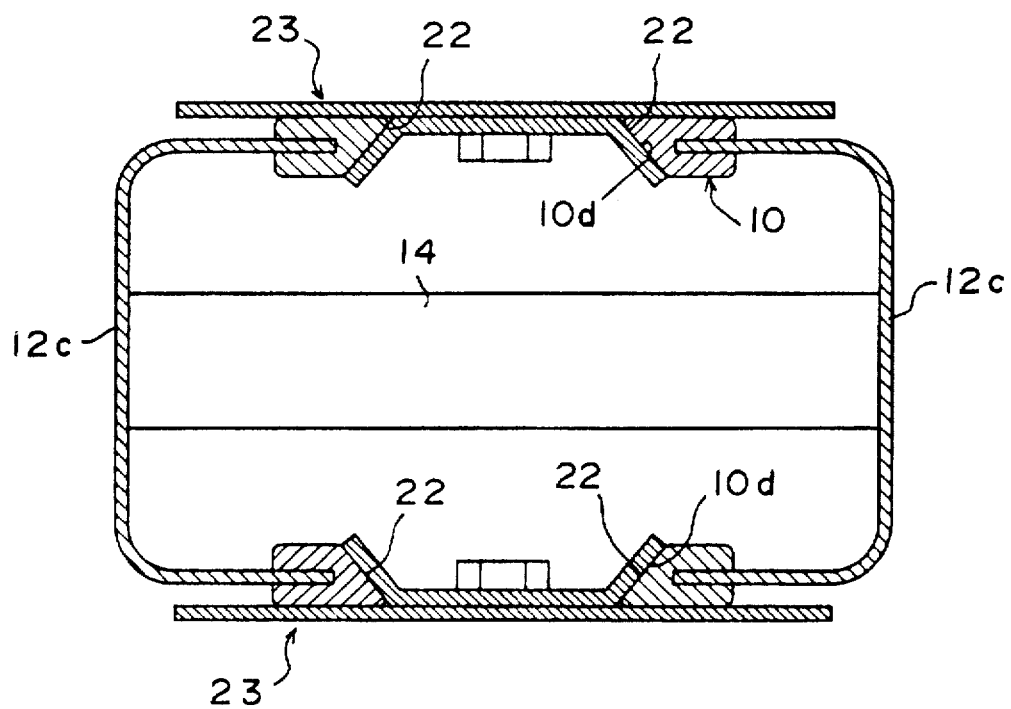
FIG. 9 is an end view, in section, similar to the embodiment shown in FIG. 5 but showing the tapered recess provided on the lower surface of a metal table top endless conveyor cooperating with tapered projections provided on the channel shaped side walls of the conveyor support frame.

FIG. 9 illustrates yet still another embodiment of the side support of the present invention, wherein the wearstrip 10 is provided with a tapered projection 10d received into a correspondingly shaped recess 22 provided on the lower surface of a metal table top endless conveyor 23.

While FIG. 2 shows one wearstrip 10 mounted on the sideplate 12, a plurality of wearstrips 10, or a continuous wearstrip can extend along the sideplates 12 of the conveyor support frame, and in the embodiments of FIGS. 1 to 4, 7, and 8, the wearstrip can extend around a curve in the conveyor support frame.

From the above description, it will be appreciated by those skilled in the art that the conveyor belt side support 1 of the present invention is an improvement over heretofore employed side supports, in that the cooperating tapered projections 7 (FIGS. 1 to 4 and 7), 16 (FIG. 5), 19 (FIG. 6), 21 (FIG. 8), and 10b (FIG. 9) and recesses 9 (FIGS. 1 to 5, 7, and 8), 18a (FIG. 6), and 22 (FIG. 9) provided selectively on the endless conveyor 2 (FIGS. 1 to 4, 7, and 8), 17 (FIG. 5), 20 (FIG. 6), and 23 (FIG. 9) and wearstrips 10 (FIGS. 1 to 5 and 7 to 9) and 18 (FIG. 6) support not only the load carrying flight, but also the return flight. The tapered configuration of the cooperating tapered recesses and projections facilitates the flushing and draining of the side supports during cleaning of the conveyor belt.

It is to be understood that the form of the invention herewith shown and described is to be taken as a preferred example of the same, and that various changes in the shape, size, and arrangement of parts may be resorted to, without departing from, the spirit of the invention or scope of the subjoined claims.

I claim:

1. In combination, a tapered side support and a plastic belt conveyor having integral sideplates, a conveyor support frame assembly including a pair of laterally spaced vertically extending sideplates having a top edge portion and a bottom edge portion, said conveyor positioned in the space between said sideplates, a first wearstrip mounted on the top edge portion of each sideplate, a tapered surface formed on each integral sideplate of said conveyor, and a correspondingly tapered recess provided in said first wearstrip, the tapered surface of each integral sideplate being slidably mounted in the tapered recess in the first wearstrip for guiding and supporting said conveyor.

2. The combination according to claim 1 wherein the conveyor is endless, a second wearstrip mounted on the bottom edge portion of each sideplate, whereby the load carrying flight and return flight of the endless conveyor are supported.

3. The combination according to claim 1, wherein the first wearstrip extends transversely across the space between the laterally spaced, vertically extending side projection means and recess means being selectively provided on the plates, a longitudinally extending channel having side walls provided in said first wearstrip, a tapered recess provided in each side wall of said channel, the tapered sideplates of said plastic belt being slidably mounted in said tapered recesses.

4. The combination according to claim 2, wherein a correspondingly tapered recess is provided in said second wearstrip, the tapered surface of each integral plate being slidably mounted in the tapered recess in the second wearstrip.

5. The combination according to claim 1, wherein a pair of conveyors are positioned in side-by-side relationship, the outboard integral sideplates of the pair of conveyors being supported by said first wearstrip, a third wearstrip positioned between the inboard integral sideplates of said pair of conveyors, oppositely facing tapered recesses provided in said third wearstrip for slidably supporting the tapered surfaces on the inboard integral sideplates.

6. The combination according to claim 1, wherein at least one notch is provided in the top edge portion of each vertically extending sideplate, on which a transversely extending pin is provided on said first wearstrip, said pin being inserted into said notch for securing the first wearstrip to said sideplate.

7. In combination, a tapered side support and a metal belt conveyor having lateral sides, a conveyor support frame assembly including a pair of laterally spaced vertically extending sideplates having a top edge portion and a bottom edge portion, said conveyor positioned in the space between said sideplates, a first wearstrip mounted on the top edge portion of each sideplate, said lateral sides of said belt having rolled, tapered edges to form projections, a tapered recess provided in said first wearstrip, the projections on the belt being slidably mounted in the tapered recess in said first wearstrip for guiding and supporting said conveyor.

8. In combination, a tapered side support and a plastic belt conveyor, a conveyor support frame assembly including a pair of laterally spaced vertically extending sideplates having a top edge portion and a bottom edge portion, said conveyor positioned in the space between said sideplates, a first wearstrip mounted on the top edge portion of each sideplate, depending projections integral with the bottom surface of the conveyor belt, a tapered surface formed on each depending projection, and a correspondingly tapered recess provided in said first wearstrip, the tapered surface of each depending projection being slidably mounted in the tapered recess in the first wearstrip for guiding and supporting said conveyor.

9. In combination, a tapered side support and a metal belt conveyor, a conveyor support frame assembly including a pair of laterally spaced vertically extending sideplates having a top edge portion and a bottom edge portion, said conveyor positioned in the space between said sideplates, a first wearstrip mounted on the top edge portion of each sideplate, said metal belt having a recess provided in the bottom surface thereof, said first wearstrip having a projection provided with a tapered surface, the tapered surface of the wearstrip being received within the metal belt recess for guiding and supporting said conveyor.

* * * * *